United States Patent [19]

Durling

[11] 4,050,746
[45] Sept. 27, 1977

[54] INVERSION BRAKE VALVE AND SYSTEM THEREFOR

[75] Inventor: Harold Durling, Elsie, Mich.

[73] Assignee: Midland-Ross Corporation, Cleveland, Ohio

[21] Appl. No.: 716,027

[22] Filed: Aug. 19, 1976

Related U.S. Application Data

[62] Division of Ser. No. 611,648, Sept. 9, 1975, Pat. No. 4,017,125.

[51] Int. Cl.² .............................................. B60T 15/12
[52] U.S. Cl. ........................................ 303/40; 303/54
[58] Field of Search ...................... 137/627.5; 188/170; 303/7, 9, 40, 52, 54

[56] References Cited

U.S. PATENT DOCUMENTS

| 3,525,555 | 8/1970 | Meyer et al. | 303/40 |
| 3,832,016 | 8/1974 | Pekrul | 303/40 |

Primary Examiner—Duane A. Reger
Attorney, Agent, or Firm—Frank J. Nawalanic

[57] ABSTRACT

A pneumatic brake system employing dual-diaphragm, spring-actuated, air-released brake actuators is provided with an inversion valve which, in the event of a brake system failure, prevents the brakes from being automatically applied while permitting controlled brake application by releasing compressed air from each actuator's spring chamber in an inverse ratio to that normally supplied from the system by the operator applied brake valve thus permitting a controlled spring brake application. The valve employs first and second pressure responsive pistons with associated valve seats to maintain the actuator springs compressed with air at supply pressure when the vehicle is normally operated. The air at supply pressure in each actuator's spring chamber is automatically ported to a lower pressure through the valve when a system failure occurs and prior to brake application to insure fast response time of the spring actuated brake.

3 Claims, 5 Drawing Figures

INVERSION BRAKE VALVE AND SYSTEM THEREFOR

This application is a division of application Ser. No. 611,648, filed Sept. 9, 1975, now U.S. Pat. No. 4,017,125.

This invention relates generally to a brake system and, more particularly, to an improved operation of such brake system when a pressure responsive valve of the type disclosed herein is included in such system.

The invention is particularly applicable to a valve for use in dual circuit pneumatic brake systems applicable to trucks. truck-tractors, buses and the like which employ dual-diaphragm, spring-actuated, air-released brake actuators and will be described with particular reference thereto. However, it will be appreciated by those skilled in the art that the invention may have broader applications and may be employed in vacuum or other fluid actuated brake systems.

Safety regulations have resulted in the commonplace use of brake actuators of the dual-diaphragm, spring-applied, air-released type in pneumatic vehicle braking systems. Such actuators comprise tandem front and rear brake chambers. The rear chamber houses a compression spring which is maintained precompressed when the vehicle is in its normal operating mode by air at primary, or system or supply or emergency pressures (hereinafter termed supply pressure). A forward air chamber is supplied with supply air modulated to secondary or control or service or signal pressure (hereinafter termed service pressure) to actuate the vehicle's brakes in a conventional manner. In the event of a failure in the air system or when the vehicle is to be parked, the rearward chamber is vented of its air to release the spring which then sets the vehicle's brakes. Obviously, if an air failure occurred while the vehicle was driven and the rear chamber was automatically vented, the sudden and full application of the vehicle's brakes would present serious control problems to the operator of the vehicle.

To prevent such problems, a valve, generally known as an inversion valve, has been employed in such systems. The function of this valve is to maintain the spring in the brake actuator compressed even though a system failure be sensed and to vent the air from the rear chamber of the brake actuator in an inverse ratio to the air at service pressure supplied to the service brake chamber by the operator through the conventional treadle valve. In this manner, the brake actuator springs would be released to exert a braking pressure which would be in "sync" with the degree of treadle valve actuation.

Heretofore, prior art inversion valves basically comprised spring loaded piston or diaphgragm arrangements as illustrated in U.S. Pat. Nos. 3,826,283 and 3,863,992. To provide a fast spring brake response time to insure equal application of the brakes, the spring precompression of the valve is established at a force which modulates system air pressure to a value which is just sufficient to maintain the springs compressed in the actuators during normal operating conditions. While such valve arrangement is thus sufficient to provide quick response for actuation of the brakes, there are two significant drawbacks to such an arrangement. First, spring rates in the brake actuators vary from one actuator to the other and the air pressure ported to the spring brake chambers may be sufficient to maintain one of the brake actuator's springs compressed while permitting the spring of another brake actuator to slightly expand until equilibrium occurs. In this event, the latter spring actuator would slightly apply the brakes of the vehicle which it controls and thus generate heat and wear on such brakes significantly reducing the life thereof. Second, such inversion valves by regulating supply air pressure to a lower value do not meet certain safety standard criteria which require that full system air pressure be applied to the emergency line of a trailer. Accordingly, the use of prior art inversion valves has been limited to certain vehicle applications. Specifically, they could not be used to modulate trailer emergency line pressure (emergency brakes) from the towing tractor. On the other hand, if the prior art inversion valves employed spring rates sufficiently high to insure supply pressure in the spring brake chambers, the response time of the spring brakes would be adversely affected with uneven brake application occurring.

It is thus an object of the invention to provide in a vehicle brake system which employs two separate brake arrangements normally actuating the vehicle brakes on different axles in a simultaneous manner, a fast-response inversion valve which is effective upon failure of one of such systems to actuate the brakes associated with the failed system in a manner which is synchronous with the brake actuation of the other, still operable system.

The object along with other features of the subject invention is achieved in a valve employing a dual-piston, dual-valve seat arrangement. In normal vehicle operation, air at supply pressure from a line servicing those brake actuators which are to be monitored biases the pistons and seats in a manner which insures fluid communication from a second line, always at supply pressure, to a delivery port in communication with the actuator's spring brake chamber. When a brake failure occurs and prior to a brake application, supply pressure will decrease resulting in relative piston movement to isolate the delivery port from the second brake line. Simultaneously, a spring biasing one of the pistons will vent a portion of the air from the spring brake chamber via the delivery port. Venting will continue until the spring force and air pressure are in equilibrium whereat the valve will be in a lapped position and the springs in the brake actuator just slightly compressed. When the vehicle operator actuates the brake or treadle valve, a third brake line in communication with air at service pressure in the unfailed brake system is applied to one of the pistons to open one of the valve seats to atmosphere against the bias of the adjustable spring to deplete air from the spring chamber of the actuator in a ratio inversely proportional to that which is applied to the service brake chambers of the brake actuators on the unfailed axle. Since some of the air in the actuator's spring brake chamber had been previously vented, the response time of the spring brake is rapid.

In accordance with another feature of the subject invention, the valve is balanced so that, in a brake failure mode, a greater pressure drop occurs in the spring brake chamber than the service pressure applied to the "unfailed" spring brake actuators. This is achieved by sizing the pressure responsive areas of the valve so that the area biasing one of the pistons from the third brake line is greater, by a predetermined amount, than the pressure area biasing the same piston from the delivery port.

In accordance with still another feature of the subject invention, there is disclosed a modification to a conventional truck-trailer brake system which meets safety criteria by supplying air at supply pressures to the emergency chambers of the tractor brake actuators and to the supply line of the trailer while incorporating the inversion valve of the subject invention to sense and control the trailer emergency brakes as well as the towing vehicle brakes when a brake failure occurs in the trailer system or towing vehicle rear service brake system.

It is thus another object of the subject invention to provide in a pneumatic brake system for a vehicle an inversion valve which ports air at supply pressure to the spring brake chamber in a normal operating mode, but which automatically senses impending brake failure to reduce air pressure in the spring brake chamber to a minimum value to insure fast response time of the spring brake when an application is required.

Yet another object of the subject invention is to provide in a pneumatic brake system for a vehicle, an inversion valve actuable upon a brake failure to apply the brakes on the failed axle in a predetermined braking ratio to the braking force developed by the air operated actuators on the other axles of the vehicle.

The invention may take physical form in certain parts and arrangement of parts, a preferred embodiment of which will be described in detail herein and illustrated in the accompanying drawings which form a part hereof and wherein:

FIG. 4 is a longitudinally sectioned view of the valve, similar to FIG. 1, but with the component parts orientated as they would appear in a lapped position of the valve.

Figure 1:
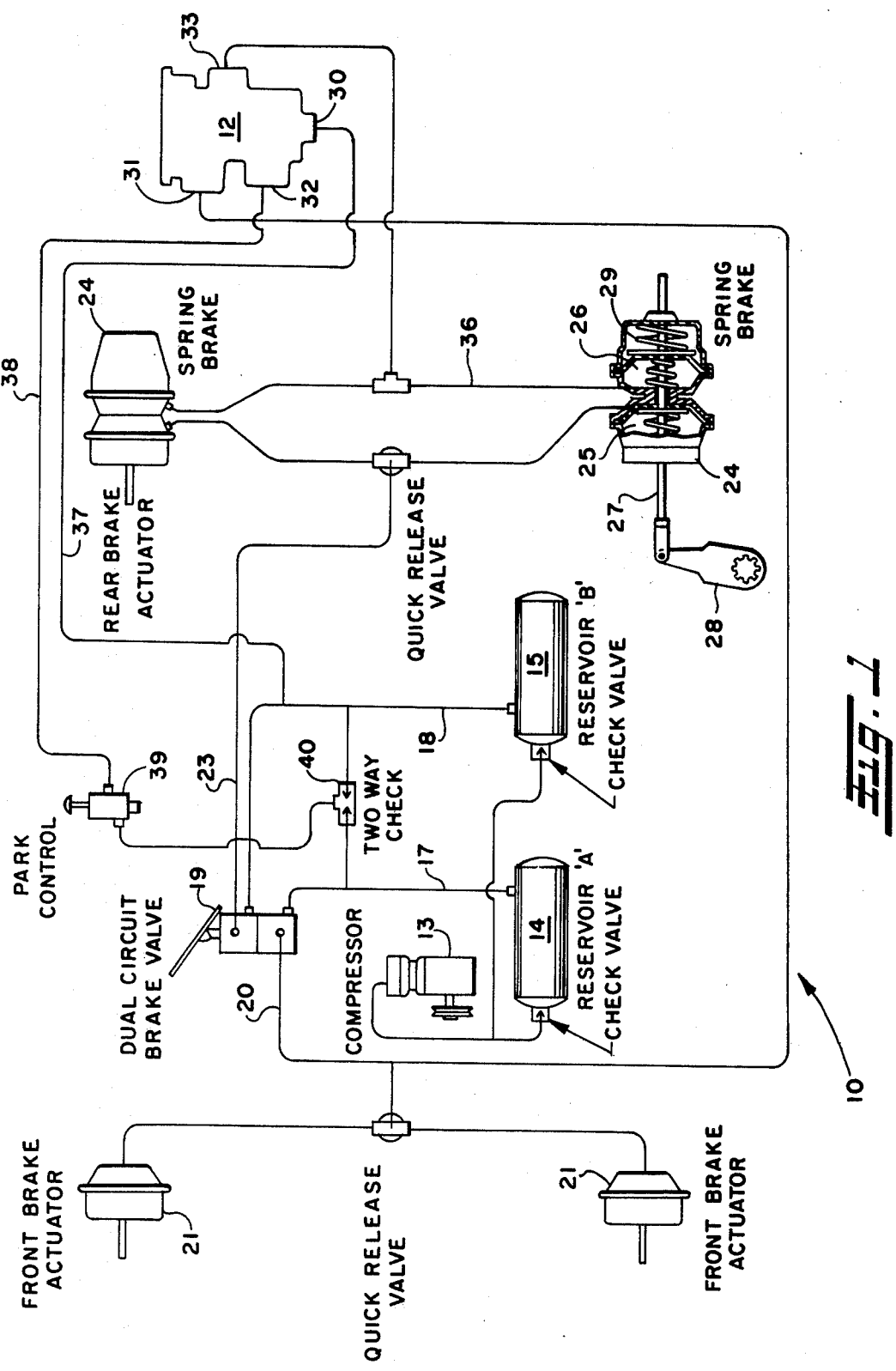
FIG. 1 is a schematic view of a typical pneumatic braking system employing the inversion valve of the subject invention.
Figure 2:
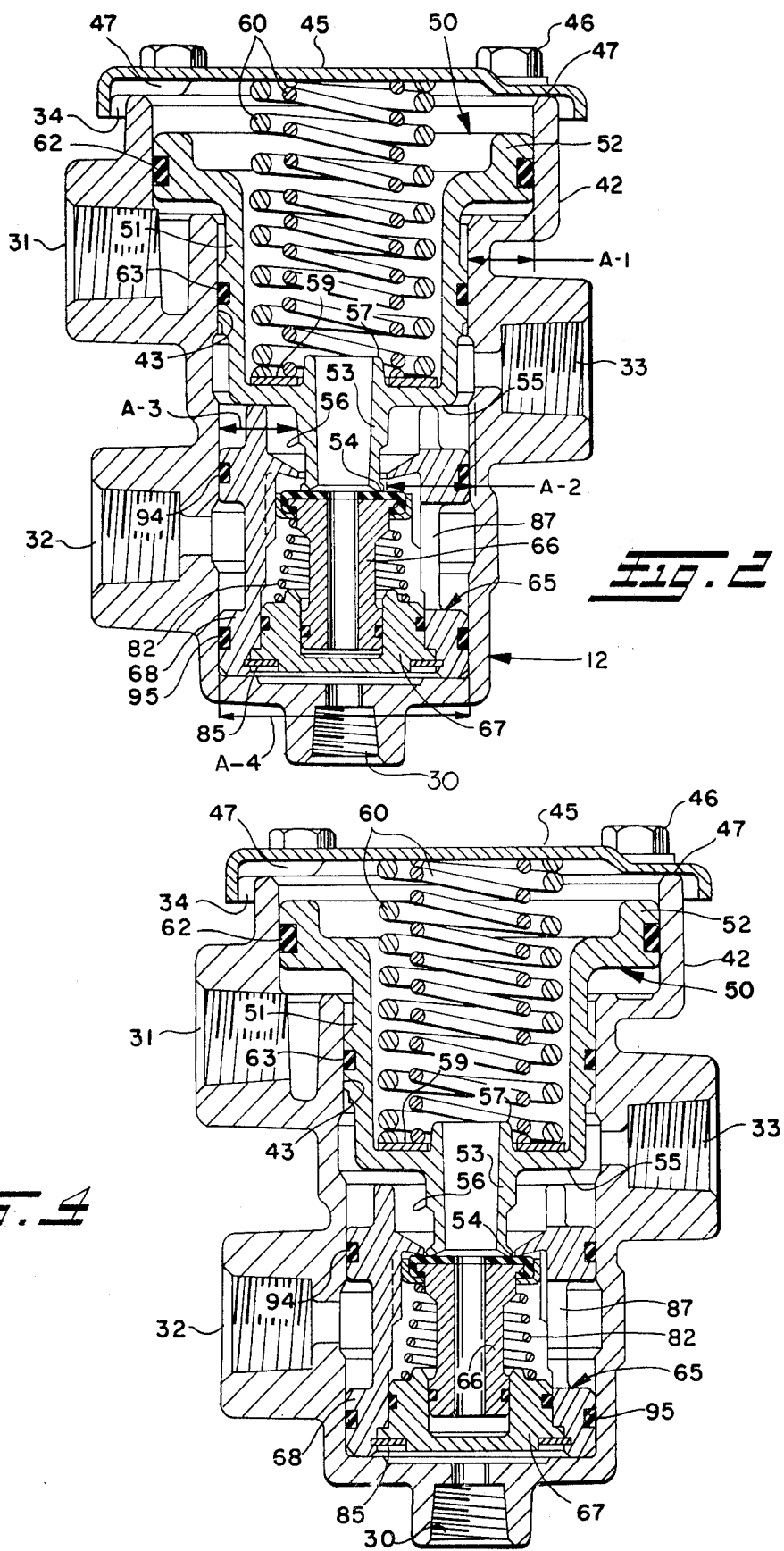
FIG. 2 is a sectional view of the inversion valve with the parts thereof orientated as they would appear without pressure in the vehicle air system.

Referring now to the drawings wherein the showings are for the purpose of illustrating a preferred embodiment of the invention only and not for the purpose of limiting same, there is shown in FIG. 1 a pneumatic brake system 10 for use on a vehicle which incorporates an inversion valve 12 of the subject invention having a first inlet port 30, a second inlet port 31, a third inlet port 32, a delivery port 33 and a vent port 34 (shown in FIG. 2).

Standard brake components shown in brake system 10 include a compressor 13 charging reservoir "A" 14 and reservoir "B" 15 with air at supply pressure which in turn is applied through brake lines 17, 18 to the inlet side of a dual circuit brake valve 19. The designation "dual circuit brake valve" is defined herein to include brake valves not only of the treadle type but also of the suspended pedal type and, in particular, refers to such valves which utilize separate valving mechanism to port air to the front and rear brakes of the vehicle. In the schematic illustrated, reservoir "A" air at supply pressure enters the lower portion of dual circuit brake valve 19 and is ported or modulated to service pressure at the outlet of valve 19 into brake line 20. Brake line 20 in turn communicates air at service pressure to front brake actuators 21 (shown to be of the single diaphragm, air-applied, spring-released type) and also communicates air at service pressure to second inlet port 31 of inversion valve 12. Similarly, air at supply pressure from reservoir "B" in line 18 enters the upper portion of dual circuit brake valve 19 where it is ported or modulated to service pressure, leaving the outlet side of the valve through a brake line 23 in turn in fluid communication with the rear brake actuators 24.

Rear brake actuators 24 are of the known dual diaphragm type and include a forward or service brake chamber 25 and a tandem rearward or emergency brake chamber 26. Service brake chamber 25 normally brakes the rear wheels of the vehicle since it receives air at service pressure through line 23 which displaces a diaphragm therein against a centrally supported output shaft 27 which in turn rotates a conventional slack adjuster mechanism 28 to apply the rear brakes of the vehicle. During normal highway operation of the vehicle, emergency brake chamber 26 is supplied air at supply pressure via brake line 36 in fluid communication with delivery port 33 of inversion valve 12 to maintain a spring 29 precompressed by a diaphragm therein. When a failure occurs in that portion of the brake system associated with reservoir "B" or when the vehicle is parked, the air at supply pressure in emergency brake chamber 26 is vented to allow compression spring 29 to expand against output shaft 27. The manner in which compression spring 29 is allowed to expand is dependent upon inversion valve 12 of the subject invention.

Completing the brake schematic is a brake line 37 "T'd" to reservoir "B" brake line 18 and connected to first inlet port 30 of inversion valve 12 which, as explained hereafter, will function as a sensor means to regulate inversion valve 12. The third inlet port 32 of inversion valve 12 is connected to brake line 38 in turn connected to a conventional park control valve 39 which always senses supply pressure by means of a conventional two way check valve 40 in fluid communication with either reservoir "A" or "B" depending upon which one is at higher pressure.

Figure 3:
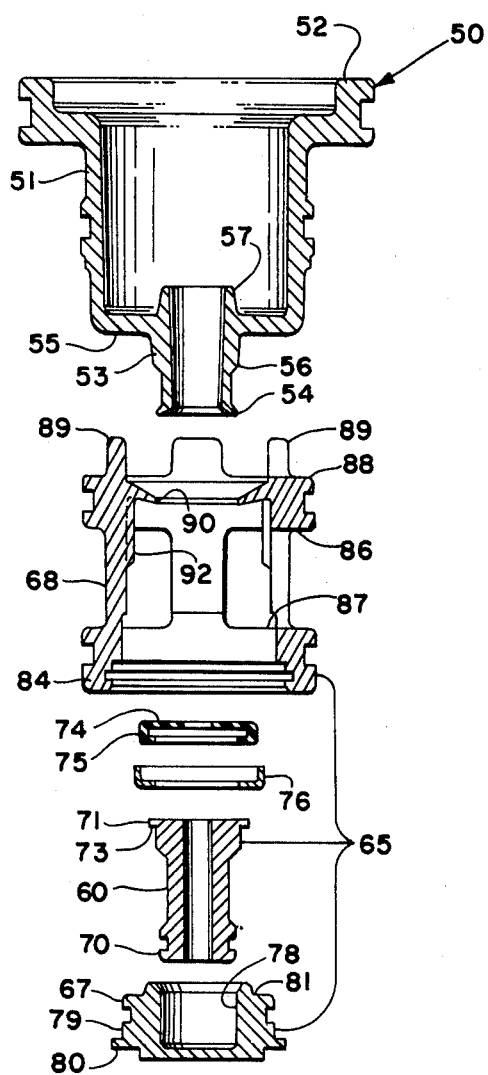
FIG. 3 is an exploded sectional view of several components of the inversion valve.

Referring now to FIGS. 2 and 3, inversion valve 12 is shown to include a valve body 42 having a stepped cylindrical bore 43 extending therein. First inlet port 30 is in fluid communication with bore 43 at one end thereof and bore 43 is closed at its opposite end by a vent cover 45 threadably fastened as at 46 to valve body 42. Ribs 47 in vent cover 45 engage the valve body's end portion opposite first inlet port 30 to define a plurality of vent passages or vent ports 34 in fluid communication with bore 43. In between vent port 34 and first inlet port 30 are second inlet port 31, third inlet port 32 and delivery port 33, all in fluid communication with bore 43. Disposed within bore 43 adjacent vent port 34 is a first hollowed, cylindrically stepped tubular piston 50. First piston 50 has a main body portion 51, an end portion 52 stepped radially outwardly from main body portion 51 and generally adjacent vent port 34. At the opposite end of main body portion 51, first piston 50 extends radially inwardly to define an annular shoulder seat surface 55 terminating in a longitudinally extending hollow stem portion 53 which in turn terminates in a flanged conical valve seat 54. The exterior of hollow stem portion 53 is stepped radially outwardly as at 56 and stem portion 53 extends into the interior of main body portion 51 to define a boss 57 for retaining a spacer-washer 59 serving as a seat for a pair of compression springs 60 functioning as biasing means to exert a bias to first piston 50 towards first inlet port 30. First piston 50 is retained within bore 43 by sealing means in the form of O-rings 63, 62 disposed within grooves located in main body portion 51 and end portion 52 respectively of first piston 50. The area between first piston 50 and bore 43 enclosed by O-rings 62, 63 defines a first pressure responsive area of the valve, hereindefined as "A-1.". The area circumscribed by first valve seat 54, bore 43, first piston 50 and O-ring 63 is defined as the second pressure responsive area of valve 12, hereindefined as "A-2".

Disposed in bore 43 adjacent first inlet port 30 is a second piston or piston means 65 defined as comprising a piston member 66, an end cap member 67 and a valve cage member 68.

Piston member 66 has a cylindrical base portion 70 at one end and a flanged end portion 71 at its opposite end. Capping the end of flanged end portion 71 is an annular seal 74 made of resilient material and having its outer periphery U-shaped as at 75 for sealing engagement with piston member annular shoulder 73. Seal 74 is grasped about its outer periphery by a metal cup-shaped annular retainer 76.

Base portion 70 of piston member 66 is adapted to be sealingly received within a centrally located, blind bore portion 78 of end cap member 67. End cap member 67 has a cylindrical main body portion 79, a flanged base portion 80 adjacent first inlet 30 at one end of main body portion 79 and a shouldered end 81 extending from the other end of cylindrical main body portion 79. Shouldered end 81 functions as a spring seat for one end of a conical spring 82 which is seated at its opposite end underneath cup-shaped member 76.

Flanged base portion 80 of end cap member 67 is lockingly engaged within a base portion 84 of valve cage member 68 by means of a snap ring 85. Valve cage member 68 is of tubular shape having a main body portion 86 extending from base portion 84, indented radially inwardly in the area of third inlet port 32 and having a plurality of openings or windows 87 to permit air passage from third inlet port 32 to its interior. Extending from main body portion 86 is a forward portion 88 from which extends a plurality of shouldered stops 89 extending in an annular array from forward portion 88 and adapted to contact shouldered seat surface 55 of first piston 50. Extending radially inwardly from the interior of forward portion 88 is a frusto-conical second valve seat 90. The diameter of second valve seat 90 is toleranced closely to the diameter of first valve seat 54 and, as shown in FIG. 2, is closely concentric with stem portion 53. Formed in the interior of valve cage member 68 and extending from second valve seat 90 towards base portion 84 and a plurality of splines 92 having an internal diameter sized closely to the external diameter of cup-shaped retainer 76 for guiding piston member 66 in its movement. The spaces between splines 92 define passages for air flow through the valve seat from third inlet port 32 to delivery port 33. Sealing means for second piston 65 are provided in the form of O-rings 95, 94 received within grooves formed in base and forward portions 84, 88 respectively of valve cage member 68.

O-rings 94, 95 function as sealing means to define a third pressure responsive area "A-3" of valve 12 specifically defined by that portion of bore 43 closed by O-rings 94, 95 and second valve seat 90. Also that portion of the bore 43 closed by O-ring 95 adjacent first inlet port 30 defines a fourth pressure responsive area "A-4." Bore 43 and the diameters of pistons 50, 65 are sized equally along their lands which contain O-rings 63, 94, 95. Pressure responsive areas "A-2" and "A-3" may be considered to be equivalent to one another and pressure responsive area "A-1" is sized greater than pressure responsive areas "A-2," "A-3," preferably at a ratio of 1.5 to 1.

OPERATION

The operation of inversion valve 12 will first be explained with reference to the brake system shown in FIG. 1 and the vehicle in a parked position with a depressurized air system. In this mode, reservoirs "A" and "B" are assumed uncharged, with service brake lines 20, 23 vented to atmosphere thus venting second inlet port 31 of inversion valve 12. Park valve 39 is vented to atmosphere thus venting brake line 38 and third inlet port 32 to atmosphere. Similarly, reservoir "B" is not pressurized and little or no pressure exists in brake line 37 and first inlet port 30 of inversion valve 12. With the pressures thus established, the component parts of inversion brake valve 12 will assume the position shown in FIG. 2. With little or no pressure at first inlet port 30, the force exerted by compression spring 60 is sufficient to bias first piston 50 downwardly in valve bore 43 sealing first valve seat 54 against seal 74 and contacting annular shoulder surfaces 55 with shoulder stops 89 forcing first and second pistons 50, 65 to "column-up" until base portion 84 of cage member 68 contacts the bottom of valve bore 43. In this position, first valve seat 54 is sealed and second valve seat 90 is opened to permit air from emergency brake chamber 26 of the rear brake actuators 24 to vent to atmosphere via delivery port 33 by traveling through pressure responsive area "A-3," around second valve seat 90, through openings in splines 92, the windows 87 in valve cage member 68 and from thence through third inlet port 32.

When the operator of the vehicle starts the engine, compressor 13 automatically charges reservoirs "A" and "B" with air at supply pressure. Reservoir "B" air at supply pressure is then ported via lines 18, 37 into first inlet port 30 and acting on area A-4 causes pistons 50, 65 to move in a column, compressing spring 60, until end portion 52 of first piston 50 contacts vent cover 45 which acts as a solid stop. First and second valve seats 54, 90 remain in their same relative position as previously described in a depressurized mode. When park control valve 39 is actuated, air at supply pressure from either reservoir "A" or "B" (whichever is higher) is supplied to third inlet port 32 and travels through the valve in the path previously described to delivery port 33, thence through brake line 36 into emergency brake chamber 26 to precompress actuator spring 29. In this position, the valve is in its normal operating highway mode and so long as a brake failure in the rear brake actuator system does not occur, air at supply pressure is ported to emergency brake chamber 26 of the rear brake actuators thus insuring that the brake actuator springs 29 do not tend to partially apply the rear brakes of the vehicle. It should also be noted that service air brake applications to the vehicle with the valve in its normal highway operating mode do not affect the valve since first piston 50 is stopped from further travel by contact with vent cover 45.

Any brake failure in the rear axle brake system which results in a loss in pressure in reservoir "B" will trigger actuation of inversion valve 12 in a manner now to be described. Reservoir "B" could lose pressure as a result of leakage or failure in reservoir "B" itself, or failure or rupture in any of the rear brake lines 18, 23, 37, or failure or leakage in dual circuit brake valve 19, or failure in rear brake actuators 24. If failure occurred in any of these components, pressure in first inlet port 30 would drop. Since air at supply pressure exists at pressure responsive area "A-2," the second piston would be forced downwardly in bore 43 while first piston 50 would remain biased against vent cover cap 45. As the pistons separate from their columned-up position which they assume in a normal operating highway mode, second valve seat 90 would move closer into a contact engaging position with seal 74. If reservoir "B" pressure continues to drop, second valve seat 90 would contact seal 74. Up to this point, conical spring 82 would maintain first valve seat 54 in sealing engagement with seal 74. Further downward movement of valve cage member 68 will result in opening first valve seat 54 while maintaining second valve seat 90 sealed. During this movement, air at supply pressure in third inlet port 32 is trapped within valve cage member 68 and is not effective to bias second piston 65 in any direction within bore 43 while second valve seat 90 is sealed. Therefore, when first valve seat 54 moves away from seal 74, air within emergency brake chamber 26 of spring brake actuator 24 will begin to vent through seat 54, and vent ports 34 to atmosphere. Accordingly, the pressure within pressure responsive area "A-2" of inversion valve 12 will drop until springs 60 overcome the force generated by air pressure acting on area "A-2" and move piston 50 downward. Equilibrium will occur when the pressure developed in area "A-2" exerts a force equal to the bias of compression spring 60. In this condition, the valve will be in a lapped position such as shown in FIG. 4 with both valve seats 54, 90 seated against seal 74. If there has been a complete failure in the pressure of the rear brake system, first piston 50 will be at the bottom of bore 43 with the bias of springs 60 exerting a force against area "A-2" just sufficient to maintain compression spring 29 and brake actuators 24 slightly compressed and valve 12 is now ready to cycle to an emergency mode for quick brake application. Under these conditions, it should be noted that a slight extension of the brake actuator output shaft, which may necessarily occur, is not viewed as a detriment since the condition is not permanent.

If a brake application is now made by the vehicle operator, service air is delivered to second inlet port 31. The service air pressure acting against area "A-1" develops a force initially additive to that developed by emergency brake chamber air acting against area "A-2" and is effective to move first piston 50 towards vent cover cap 45 opening delivery port 33 to atmosphere via first valve seat 54. The pressure of the air in emergency brake chamber 26 is reduced to a lower value which multiplied by area "A-2" develops a force that is additive to that developed by service air pressure in area "A-1" to equalize the bias of spring 60 whereat the valve returns to the lapped position. While areas "A-2" and "A-1" could be equal, it is desirable, for energy considerations, to have spring 29 of rear brake actuators 24 expand or travel further against output shaft 27 to insure a brake application force at rear brake actuators 24 at least equal to that developed by the unfailed front brake actuators 21. Thus pressure responsive area "A-1" is sized to be slightly greater than area "A-2" and preferably 1.5 times as great. This permits the air pressure within emergency brake chamber 26 to drop in pressure at a rate 1.5 times as great as that which is applied by air at service pressure. While it is contemplated that inversion valve 12 of the subject invention could be manufactured with various ratios of areas "A-1" and "A-2," a ratio higher than 1.5 to 1.0 may not be desired. Generally speaking, spring brake torque must always remain under the control of the vehicle operator. Assuming that the unfailed axles of the vehicle are equipped with antiskid devices or antilock controlled, a ratio higher than 1.5 to 1.0 may result in an overly severe brake reaction from the spring brakes. In such instance, the spring brakes could lock the wheels they control while the wheels unfailed under antilock control would not lock. It has been discovered that an inversion valve ratio of approximately 1.5 to 1.0 provides a good balanced brake reaction between unfailed and failed brake actuators although in antilock installations the inversion valve could adequately function at ratios less than 1.5 to 1.0.

After service brake application has been completed, second inlet 31 will be vented to atmosphere by dual circuit brake valve 19 venting air from pressure responsive area "A-1." Springs 60 will force first valve seat 54 against seal 74 compressing conical spring 82 to open second valve seat 90. This will establish fluid communication between third inlet port 32 and delivery port 33. Pressure will build in area "A-2" and emergency brake actuator chamber 26 until equilibrium is reached with spring 60 whereat first piston 50 will move towards vent cover cap 45 to seat second valve seat 90 against seal 74 establishing a lapped position of the valve and readying same to be triggered for the next brake application.

Figure 5:
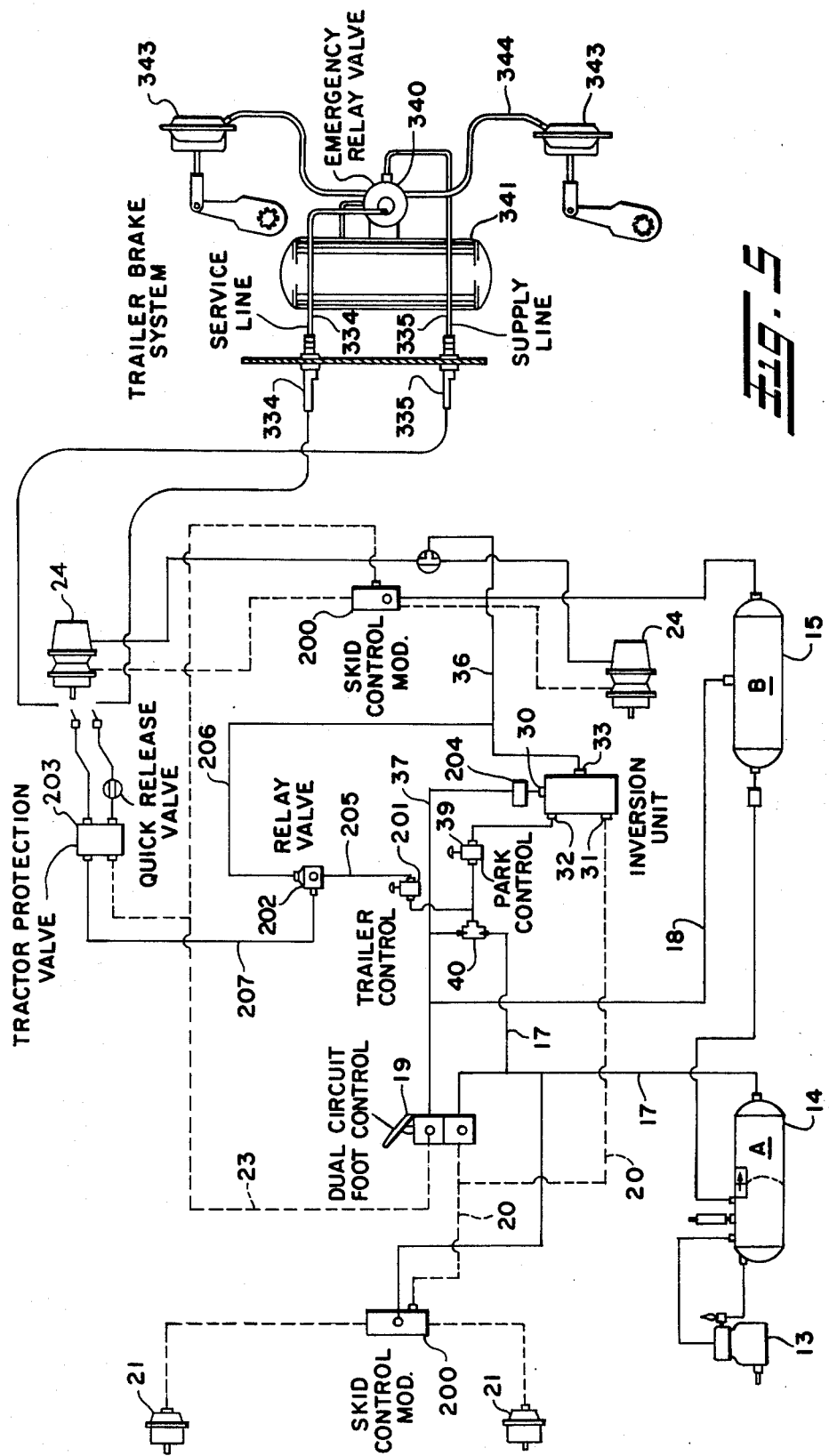
FIG. 5 is a tractor-trailer brake system including the inversion valve as one of its component parts.

The features and operating characteristics of inversion valve 12 of the subject invention, as thus described, make inversion valve 12 suitable for unique application to a tractor-trailer brake system. Such application is shown in FIG. 5 which illustrates the unique tractor-trailer brake system which offers safety advantages not possible with conventional air brake systems. As illustrated, a tractor brake system employing conventional antiskid or antilock system is shown on the lefthand side of FIG. 5 and a conventional emergency relay type trailer brake system is shown on the righthand side of the drawing, although it should be clear to those skilled in the art that the trailer will function in the brake system illustrated if equipped with the standard type of antiskid or antilock brake arrangement. With respect to the tractor brake system illustrated, dotted lines refer to brake lines with air at service pressure and solid lines refer to brake lines with air at supply pressure and like numbers with reference to FIG. 1 will designate like parts where applicable.

The conventional trailer system illustrated in FIG. 5 includes an emergency relay valve 340 which is connected to service and supply lines 334, 335 respectively, a reservoir 341 and trailer brake actuators 343 through suitable lines 344. Trailer brake actuators 343 are shown to be of the single diaphragm, air applied-spring released type although other brake actuators may be applied to the trailer system if slight changes, known to those skilled in the art, be made in the fluid communication lines. Independent of the brake actuators employed, emergency relay valve 340 functions in the usual manner to emit reservoir pressure to brake actuators 343 when dual circuit valve 19 is depressed and vent same when the dual circuit valve is released. Similarly, in the event of a predetermined pressure drop in supply line 335, relay valve 340 is actuated to supply air at system pressure from reservoir 341 to trailer brake actuators 343 to set the brakes. When supply pressure is restored in line 335, relay valve 340 vents the air in trailer brake actuators 343 to re-establish normal operating mode of the system.

With respect to the tractor brake system, the additional components illustrated therefor in FIG. 5 and not shown in FIG. 1 include conventional skid control modulator valve 200 and appropriate brake line plumbing associated therewith, known to those skilled in the art and thus not described in detail herein. Component valves shown in FIG. 5 which render inversion valve 12 suitable for tractor-trailer application include a trailer control valve 201, a relay valve 202, a tractor protection valve 203 and a governor valve 204, all these valves are known to those skilled in the art and thus are not shown or described in detail herein.

Governor valve 204 is inserted in line 37 and functions as an on-off switch controlling air to first inlet port 30 of inversion valve 12. Governor valve 204 is typically set at approximately 75-80 psi and so long as rear brake reservoirs "B" develop a pressure exceeding this value, reservoir "B" will be in fluid communication with first inlet port 30. When pressure in reservoir "B" drops below 75-80 psi, governor valve 204 will act to prevent fluid communication between reservoir "B" and first inlet port 30 and will also drop the pressure at first inlet port 30 to atmosphere through a vent mechanism provided in governor valve 204 thereby rendering inversion valve 12 ready for complete spring brake application. The advantage of this will be explained later.

Trailer control valve 201 is similar in operation to park control valve 39 and operates, upon application, to vent the trailer supply line of air. The trailer emergency relay valve responds in a known manner to apply the trailer brakes when this line is vented. The inlet of trailer control valve 201 is in fluid communication with the outlet of two way check valve 40 and thus always senses air at supply pressure. The outlet of trailer control valve 201 is in fluid communication with a brake line 205 in turn in fluid communication with the reservoir port of relay valve 202.

A brake line 206 in fluid communication at one end with delivery port 33 of inversion valve 12 is in fluid communication with the control port of relay valve 202. Brake line 206 and control port of relay valve 202 may be viewed as a line carrying a source of fluid at a signal pressure. A third brake line 207 is in fluid communication with the outlet of relay valve 202. When air at signal pressure exists in brake line 206, relay valve 202 cycles to provide full fluid communication between brake lines 207 and 205. When air pressure in line 206 drops below 75-80 psi (signal pressure), relay valve 202 is actuated to produce a similar drop in pressure between lines 205 and 207. When trailer control valve 201 is vented in an actuated position, line 205 is vented and relay valve 202 receives no air at its reservoir port, therefore no delivery is possible.

Brake line 207 is in fluid communication with the air supply line inlet of tractor protection valve 203. Tractor protection valve 203 operates to provide fluid communication with air at supply and service pressures on the tractor to that on the trailer so long as air at supply pressure enters its inlet side. If supply pressure air drops at the inlet side of tractor protection valve 203, tractor protection valve 203 cycles to prevent fluid communication of air at service pressure from the tractor side to the trailer side. A typical tractor protection valve will cycle to its "off" position when supply line pressure drops to approximately 30-40 psi.

In operation and with reference to the previous description of the operation of inversion valve 12, it should be clear that in the normal highway operating mode, air at full supply pressure will enter third inlet port 32 and exit delivery port 33 to maintain springs 29 of the spring actuators 24 fully compressed. Tractor protection valve 203 will be biased into its open position and the trailer supply line 335 will be pressurized in the normal manner.

A normal service brake application results in conventional response from the system. Tractor front service brakes are actuated by pressure in line 20. Rear service and trailer brakes are actuated by pressure in line 23. At this point it is important to note that the trailer supply line is pressurized from lines 207 and 205 by way of valves 202, 201 and 40. Air from either part of the tractor dual circuit brake system can fill this supply line. The trailer signal line receives pressure by way of line 23 from valves 203 and 19 and as such is only able to draw pressure from reservoir "B." This feature has several advantages during emergency stops when one or more components of the service brake air system have failed as discussed below.

One particular failure worth considering is a broken or disconnected trailer service line. This has serious consequences with conventional systems. The service line is unpressurized unless a brake application is made. The open line goes unnoticed by a driver since no air escapes, but when a brake application is required, a massive leak occurs. This leakage rapidly drains a conventional tractor air brake system diminishing the tractor brake effectiveness, and since the trailer service line is open, the trailer brakes remain inoperative. Even the newer dual air brake systems do not correct this deficiency. With the proposed system, the vehicle driver retains control of the tractor and trailer brakes and brake effectiveness is not greatly impaired. The brake application would initially result in massive leakage from the open hose as before, except this leakage would only affect reservoir "B." Pressure in reservoir "B" would rapidly fall to 75-80 psi at which time governor 204 would function to exhaust port 30 of the inversion valve. This causes the inversion valve to function as described above. The delivery pressure from the valve automatically drops to its preset emergency level or if the brake application is still being held, the inversion valve delivery will be further reduced by 1.5 times the amount of the service application. During this time, the tractor front brakes have been fully active and the rear brakes active to the extent allowed by reservoir pressure at "B." The trailer brakes had been inoperative to this point. The reduction of delivery pressure from the inversion valve changes this situation. Reduced pressure in line 206 is sensed by relay valve 202 and as a result pressure in line 207 drops quickly to the same level. Two events occur due to the pressure drop in line 207. First, the tractor protection valve 203 cycles in a known manner to close off the passage between line 23 and the open trailer signal line. This stops the air leak from the tractor and retains 75-80 psi in reservoir "B." The second reaction is by the trailer emergency relay valve. This valve functions in a known manner upon reduction of pressure in line 207 to automatically apply the trailer emergency brakes. This series of events occurs rapidly and automatically so that the braking performance of the vehicle is not greatly different from that experienced when the trailer signal hose is connected. Once the stop has been made and the brake treadle released, the inversion valve delivery pressure goes up to the preset emergency level. This pressurizes line 206 thus cycling relay valve 202 to permit supply pressure communication between lines 205 and 207 thereby opening the tractor protection valve connection between the tractor and trailer to pressurize the trailer supply line for releasing the trailer emergency brakes. The system response to the open trailer signal hose failure is thus far superior to that of conventional systems. This performance is made possibly by the full pressure delivery characteristic of the inversion valve which allows this valve to be interposed in the trailer supply line. In general, a valve that delivers a regulated pressure lower than the supply pressure should not be used in the towed vehicle supply line. Thus other known inversion control valves should not be used in this application.

The above description illustrates the functional interrelationships of the various valves in system shown by FIG. 5. Persons familiar with vehicle air brake systems will recognize that this system is capable of stopping the vehicle under all manner of situations regardless of failures that may occur in one or more components and is, therefore, safer than conventional systems.

The invention has thus been described with reference to a preferred embodiment. Obviously, modifications and alterations will occur to others upon reading and understanding the specification. For example, fasteners securing the vent cover to the valve body could be modified to be adjustable so that the compression spring force could be adjustable. The valve parts could be inverted. The piston shapes changed and valve seal could be attached to the first piston. It is my intention to include all such modifications insofar as they come within the scope of the invention.

It is thus the essence of the invention to provide in a fluid actuated, vehicular brake system employing dual diaphragm brake actuators on at least one axle of the vehicle, an inversion valve which is normally effective to maintain the springs in the brake actuators compressed at supply air pressure and which is capable of rapidly applying the spring brakes of the brake actuators upon a system failure in a predetermined ratio to the braking force generated by other brake actuators employed on the vehicle.

Having thus defined the invention I claim:

1. A valve for use with brake actuators in a fluid-actuated braking system where sources of pressure at varying levels exist at valve ports comprising:

a valve body having a generally closed cylindrical bore therein, said body having a first inlet port in fluid communication with one end of said bore, a vent port in fluid communication with the opposite end of said bore, second and third inlet ports and a delivery port in fluid communication with said bore;

a first cylindrically stepped single-piece piston within said bore generally adjacent said vent port, said first piston having a hollow stem in fluid communication at one end with said vent port and defining a first valve seat at its opposite end, said first piston including sealing means circumferentially disposed thereabout to define with said bore a first pressure responsive area in fluid communication with said second inlet port and to define with said bore and said first valve seat a second pressure responsive area said first pressure responsive area being at least as great as said second pressure responsive area but not greater than 1.5 time said second pressure responsive area;

biasing means contacting said first piston tending to move said first piston toward said first inlet port;

a second cylindrically stepped piston within said bore generally adjacent said first inlet port, said second piston including a second valve seat facing and generally concentric with said first valve seat, second sealing means circumferentially disposed about said second piston to define with said bore a third pressure responsive area in fluid communication with said first inlet port and to define with said bore and said second valve seat a fourth pressure responsive area in fluid communication with said third inlet port;

sealing means associated with one of said pistons effective to (i) seal said first and second valve seats to prevent fluid communication between said third inlet port, said vent port and said delivery port when said pressure at said outlet port acting over said second pressure responsive area equals the pressure exerted by said biasing means and said pressure developed at said first inlet port is typically zero to define a lapped position of said valve and (ii) sealing said first valve seat while opening said second valve seat to provide fluid communication between said delivery port and said vent port at a rate equal to the ratio of said first area and divided by said second area as pressure is supplied to said second inlet port to define a dump position of said valve; said valve moving from said dump position to said lapped position when the pressure at said delivery port acting over the second area is equal to the pressure at said first port times the ratio of the second area divided by the first area.

2. A valve for use with brake actuators in a fluid-actuated braking system where sources of pressure at varying levels exist at valve ports comprising:

a valve body having a generally closed cylindrical bore therein, said body having a first inlet port in fluid communication with one end of said bore, a vent port in fluid communication with the opposite end of said bore, second and third inlet ports and a delivery port in fluid communication with said bore;

a first cylindrically stepped piston within said bore generally adjacent said vent port, said first piston having a hollow stem in fluid communication at one end with said vent port and defining a first valve seat at its opposite end, said first piston including sealing means circumferentially disposed thereabout to define with said bore a first pressure responsive area in fluid communication with said second inlet port and to define with said bore and said first valve seat a second pressure responsive area;

biasing means contacting said first piston tending to move said first piston toward said first inlet port;

a second cylindrically stepped piston within said bore generally adjacent said first inlet port, said second piston including a second valve seat facing and generally concentric with said first valve seat, second sealing means circumferentially disposed about said second piston to define with said bore a third pressure responsive area in fluid communication with said first inlet port and to define with said bore and second valve seat a fourth pressure responsive area in fluid communication with said third inlet port;

sealing means associated with one of said pistons effective to open and close said first and second valve seats;

said second piston includes (a) a piston member having a cylindrical base portion generally adjacent said first port and a flanged end portion opposite said base portion, (b) a generally cylindrical end cap having a central blind opening extending from one side thereof for receiving in sealing engagement said base portion and (c) a tubular valve cage member in sealing engagement with said bore, said valve cage member sealingly receiving said end cap at one end and having a plurality of shoulders extending from its opposite end for contacting said first piston, and said sealing means including a resilient member secured to said flanged portion of said piston member.

3. The valve of claim 2 wherein said first piston has a main body portion approximately equal in diameter to said end portions of said valve cage member, an end portion stepped radially outwardly from said main body portion generally adjacent said vent port, an opposite end portion stepped radially inwardly from said main body portion and terminating in said first valve seat, said valve cage member having a frusto-conical surface extending radially inwardly from the interior of said cage member and at opposite end thereof to define said second valve seat, and a plurality of splines extending radially inwardly from the interior of said cage member, said splines circumscribing and in guiding contact with said seal.

* * * * *